US012338325B2

(12) United States Patent
Wang et al.

(10) Patent No.: US 12,338,325 B2
(45) Date of Patent: Jun. 24, 2025

(54) ARAMID POLYMERIZATION METHOD USING CARBON DIOXIDE AS SOLVENT

(71) Applicant: Finings Co. Ltd., Huai'an (CN)

(72) Inventors: Nongyue Wang, Huai'an (CN); Guoqiang Wen, Huai'an (CN); Quanzhong Zhao, Huai'an (CN); Jianming Shao, Huai'an (CN)

(73) Assignee: FININGS CO. LTD., Huai'an (CN)

( * ) Notice: Subject to any disclaimer, the term of this patent is extended or adjusted under 35 U.S.C. 154(b) by 0 days.

(21) Appl. No.: 18/365,951

(22) Filed: Aug. 4, 2023

(65) Prior Publication Data

US 2023/0383059 A1 Nov. 30, 2023

Related U.S. Application Data

(62) Division of application No. 16/611,639, filed as application No. PCT/CN2018/080832 on Mar. 28, 2018, now abandoned.

(30) Foreign Application Priority Data

May 15, 2017 (CN) .......................... 201710337418.5

(51) Int. Cl.
*C08G 69/32* (2006.01)
*C08G 69/28* (2006.01)

(52) U.S. Cl.
CPC ............. *C08G 69/32* (2013.01); *C08G 69/28* (2013.01)

(58) Field of Classification Search
None
See application file for complete search history.

(56) References Cited

U.S. PATENT DOCUMENTS

| | | | |
|---|---|---|---|
| 3,850,888 A | 11/1974 | Fitzgerald et al. |
| 3,884,881 A | 5/1975 | Bice et al. |
| 4,684,409 A | 8/1987 | Hodge et al. |
| 4,737,571 A | 4/1988 | Hodge et al. |
| 4,885,356 A | 12/1989 | Milligan et al. |
| 5,420,231 A | 5/1995 | Delius et al. |
| 5,621,067 A | 4/1997 | Lin et al. |
| 6,025,459 A | 2/2000 | DeSimone et al. |
| 2004/0230027 A1 | 11/2004 | Etchells, III et al. |
| 2014/0073719 A1 | 3/2014 | Park et al. |
| 2016/0096930 A1 | 4/2016 | Park et al. |

FOREIGN PATENT DOCUMENTS

| | | |
|---|---|---|
| CN | 102167815 A | 8/2011 |
| CN | 102766260 A | 11/2012 |
| CN | 103469573 A | 12/2013 |
| CN | 103469602 A | 12/2013 |
| CN | 102731778 B | 5/2014 |
| CN | 104744689 A | 7/2015 |
| CN | 106046364 A | 10/2016 |
| CN | 107200843 A | 9/2017 |
| GB | 2225588 A | 6/1990 |
| JP | 2002348373 A | 12/2002 |
| JP | 2004249175 A | 9/2004 |
| JP | 2006111720 A | 4/2006 |
| JP | 2012236923 A | 12/2012 |
| KR | 20110075993 A | 7/2011 |
| KR | 20140133147 A | 11/2014 |
| RU | 2015110835 A | 10/2016 |

OTHER PUBLICATIONS

Machine translation of JP 2006111720A (Year: NA).*
Elke Bach et al., Past, present and future of supercritical fluid dyeing technology (II), Dyeing and Finishing, vol. 29, No. 4, pp. 37-45 (Apr. 2003).
Zhou, Jian-Jun et al., "Supercritical carbon dioxide assisted hexamethylene diisocyanate modify aramid fiber," Synthetic Fiber in China, vol. 41, No. 5, pp. 1-4 (May 2012).
Cai, Huaixin et al., "Fundamental Physics, vol. II, Chapter 22—State of Material and Phase Change," p. 492 (May 2003).
Canelas et al., "Polymerization in liquid and supercritical carbon dioxide," Advances in Polymer Sciences, vol. 133, pp. 103-140, Springer (1997).
Dencheve et al., "Manufacturing and properties of aramid reinforced composites," Chapter 8 in Bhattacharyya et al., Synthetic Polymer-Polymer composites, Hanser Publications, pp. 251-280 (2012).
Knez et al., "Industrial applications of supercritical fluids: a review," Energy 77 (2014) pp. 235-243 (2014).

* cited by examiner

*Primary Examiner* — Rachel Kahn
(74) *Attorney, Agent, or Firm* — Mei & Mark LLP; Manni Li

(57) ABSTRACT

Disclosed herein is a method for aramid polymerization using carbon dioxide as a solvent, comprising reacting phenylenediamine with benzenedicarbonyl dichloride, wherein an acid-binding agent is added to the reaction system, and liquid carbon dioxide and/or a supercritical carbon dioxide fluid is used as a reaction solvent. The method of the present application is environmentally friendly, saves resources, has low cost, and is safe for production and suitable for industrial production. The polycondensate obtained in the present application has a controllable molecular weight, a good product quality, and an intrinsic viscosity $\eta_{inh}$ of 8-9 dl/g. The yield in the aramid condensation stage can reach 98%, and the recovery rate of the aramid condensation solvent is higher than 90%.

10 Claims, No Drawings

ARAMID POLYMERIZATION METHOD USING CARBON DIOXIDE AS SOLVENT

CROSS-REFERENCE TO RELATED APPLICATIONS

The subject application is a divisional application of U.S. Patent Application No. 16/611,639 filed on Nov. 7, 2019, which is a U.S. national stage of PCT/CN2018/080832 filed on Mar. 28, 2018, which in turn claims priority on Chinese Patent Application No. 201710337418.5 filed on May 15, 2017 in China. The contents and subject matters of the PCT international application and the U.S. and Chinese priority applications are incorporated herein by reference.

TECHNICAL FIELD

The present invention belongs to the field of organic polymer compounds, and relates to a method for aramid polymerization, in particular to a method for aramid polymerization using carbon dioxide as a solvent.

BACKGROUND OF THE INVENTION

Aramids 1313 and 1414 are polyamide fibers that are formed by polycondensation of (m- or p-) benzenedicarbonyl dichloride with (m- or p-) phenylenediamine followed by solution spinning. They are mainly used for protection against atomic radiation, materials for high-altitude and high-speed flight, etc., and can also be used for tire meridian with special requirements, high temperature-resistant materials for clothing, honeycomb parts, high temperature pipeline, aircraft fuel tank, firewall, reverse osmosis membrane, hollow fiber, etc.

The main methods for synthesizing aramid at home and abroad include: low-temperature solution polycondensation method, direct polycondensation method, ionic liquid polycondensation method, and fuming sulfuric acid polycondensation method. At present, only the low-temperature solution polycondensation method has been industrialized, and other methods have not been reported for industrialization. The low-temperature solution polycondensation method was first invented by DuPont Co., US in 1972, and has been used until now. The theory and industrialization of this synthesis method have been thoroughly studied, and the obtained polymers can be adapted to various applications of high, medium and low grades. Due to good dissolving capacity for monomers and polymers, hexamethylphosphoric triamide (HMPA) was often used in the early years. For examples, U.S. Pat. Nos. 3,850,888 and 3,884,881 disclose low-temperature polycondensation methods using HMPA as a solvent. However, HMPA was later found to be carcinogenic, so it was gradually replaced with N-methylpyrrolidone (NMP). EP0229714 and U.S. Pat. No. 4,737,571 both disclose low-temperature polycondensation methods using NMP as a solvent. Since NMP is inferior to HMPA in terms of dissolving capacity, a salt, such as lithium chloride, calcium chloride, or the like, is generally added to improve the solubility. Since preparation of aramid by low-temperature solution polycondensation method has been successfully used in the industry, most of current studies are focused on further optimization of the reaction process, reduction of the cost, etc., such as in CN106046364A, CN102731778B, etc.

Although the low-temperature solution polycondensation method using NMP as a solvent is the main method for synthesizing commercial aramid, there are some problems in this method: (1) The product quality is unstable. Because NMP is a substance that easily absorbs water, and the reaction system requires a moisture content of less than 200 ppm, the presence of moisture is fatal to the reaction, resulting in a sharp decrease in molecular weight. Moreover, the dehydration of NMP and the control of moisture in the reaction system are relatively difficult. (2) The solvent is difficult to recover and the production sewage is difficult to treat. After the reaction, the solvent NMP needs to be washed away with water. Since NMP is easily soluble in water and difficult to separate, the solvent is difficult to recover. In addition, the organic base-based acid absorbent such as pyridine added to the reaction system is also unfavorable to the recovery of the NMP solvent.

Technical Problems

The problems to be solved by the present invention are difficult control of product quality and difficult recovery of the solvent in current methods for polymerization and synthesis of aramid, and a method for aramid polymerization using carbon dioxide as a solvent is provided herein.

Technical Solutions to the Problems

In order to solve the above problems, the present invention employs the following technical solution:

A method for aramid polymerization using carbon dioxide as a solvent, comprising reacting phenylenediamine with benzenedicarbonyl dichloride, wherein an acid-binding agent is added to the reaction system, and liquid carbon dioxide and/or a supercritical carbon dioxide fluid is used as a reaction solvent.

Those skilled in the art can understand how to place $CO_2$ in a liquid state or in a supercritical state.

Preferably, when liquid carbon dioxide is used as a reaction solvent, the reaction temperature is lower than the critical temperature of $CO_2$ and higher than the triple-point temperature of $CO_2$, and the reaction temperature is between −56.6 and 31.1° C.; and during the reaction, it is necessary to maintain a pressure at which the carbon dioxide is maintained in a liquid state at the reaction temperature, preferably, a pressure of 0.55-45 MPa.

When liquid carbon dioxide is used as a reaction solvent in the present application, the reaction temperature can be any value in the range of −56.6 to 31.1° C. or in a range defined by a combination of any values within the range, for example, −55° C., −50° C., −45° C., −40° C., −35° C., −30° C., −25° C., −20° C., −15° C., −10° C., −5° C., 0° C., 5° C., 10° C., 15° C., 20° C., 25° C., 30° C., −50 to −5° C., −20 to 5° C., −10 to −5° C., 0 to 25° C., or −15 to −25° C. During the reaction, it is necessary to maintain a pressure at which the carbon dioxide is maintained in a liquid state at the reaction temperature, preferably, a pressure of 0.55-45 MPa, as long as the pressure can make carbon dioxide in a liquid state at the temperature. The pressure can be any value in the range of 0.55 to 45 MPa or in a range defined by a combination of any values within the range, for example, 1 MPa, 5 MPa, 10 MPa, 15 MPa, 20 MPa, 25 MPa, 30 MPa, 35 MPa, 40 MPa, 45 MPa, 5-20 MPa, 10-20 MPa, 15-30 MPa, 15-40 MPa, or 30-40 MPa.

When supercritical carbon dioxide fluid is used as a reaction solvent, the reaction environment is maintained above the critical temperature and the critical pressure of $CO_2$, i.e., the reaction temperature is higher than 31.1° C., and the reaction pressure is greater than 7.29 MPa. Preferably, the reaction temperature is between 31.1 and 120° C., and the pressure is between 7.29 and 50 MPa.

Preferably, when supercritical carbon dioxide fluid is used as a reaction solvent in the present application, the reaction temperature can be any value in the range of 31.1 to 120° C. or in a range defined by a combination of any values within the range, for example, 35° C., 40° C., 45° C., 50° C., 55° C., 60° C., 65° C., 70° C., 75° C., 80° C., 85° C., 90° C., 95° C., 100° C., 105° C., 110° C., 115° C., 120° C., 40-55° C., 45-60° C., 50-70° C., 60-100° C., 80-120° C., 32-120° C., or the like. The pressure can be any value in the range of 7.29 to 50 MPa or in a range defined by a combination of any values within the range, for example, 8 MPa, 10 MPa, 15 MPa, 20 MPa, 25 MPa, 30 MPa, 35 MPa, 40 MPa, 45 MPa, 50 MPa, 10-20 MPa, 15-30 MPa, 25-45 MPa, or 8-50 MPa.

The use of liquid carbon dioxide and supercritical carbon dioxide as solvents, as used herein, refers to use of the heat released from the reaction or an input or output of external heat to cause transition of carbon dioxide between the liquid state and the supercritical state, such that the entire reaction process is performed in both liquid carbon dioxide and supercritical carbon dioxide.

In the preparation process of the invention, the carbon dioxide can be initially controlled in a liquid state, then the carbon dioxide becomes supercritical when the heat released from the reaction of phenylenediamine with benzenedicarbonyl dichloride increases the temperature of the solution to exceed the critical temperature of carbon dioxide, and the pressure is also greater than the critical pressure of 7.29 MPa, and then the reaction can be continued to complete in the supercritical state.

The molar ratio of the phenylenediamine to the benzenedicarbonyl dichloride is 0.95-1.0: 0.95-1.0. Preferably, the molar ratio of the phenylenediamine to the benzenedicarbonyl dichloride needs to be strictly controlled to be 1:1; otherwise, the polymerization reaction can be easily terminated, which affects the product quality.

Preferably, the acid-binding agent is an organic base and/or an inorganic base.

Preferably, the acid-binding agent is added to the reaction in an amount 0.95-1.2 times the theoretical stoichiometric amount required to neutralize the generated hydrogen chloride according to the amounts of phenylenediamine and benzenedicarbonyl dichloride. Preferably, the acid-binding agent is added to the reactor in an amount 1.01-1.1 times the theoretical stoichiometric amount required to neutralize the generated hydrogen chloride according to the amounts of phenylenediamine and benzenedicarbonyl dichloride. For example, when 1 mol of hydrogen chloride will be produced theoretically according to the amounts of phenylenediamine and benzenedicarbonyl dichloride, 0.95-1.2 mol of triethylamine, preferably a slight excess, i.e., 1.01-1.1 mol of triethylamine should be used.

The organic base is an amine, preferably a tertiary amine, i.e., a compound having a tertiary amino group, for example, triethylamine, trimethylamine, tripropylamine, tributylamine, dimethylisopropylamine, dimethylcyclohexylamine, pyridine, 4-methylmorpholine, 4-ethylmorpholine, 4-butylmorpholine, N-methylpyrrolidine, N-ethylpyrrolidine, N-methylpiperidine, N-ethylpiperidine, N-methylindole, N-ethylindole, N-methylpyrrole, or the like.

The inorganic base can be, without any limitation, a well-known inorganic base, for example, sodium carbonate, calcium hydroxide, calcium carbonate, potassium hydroxide, lithium hydroxide, potassium carbonate, lithium carbonate, sodium bicarbonate, magnesium hydroxide, potassium bicarbonate, lithium bicarbonate, magnesium carbonate, sodium hydroxide, or the like.

It was found during the study that when the acid-binding agent is a mixture of an organic base and an inorganic base, in particular, when the amount of the organic base used is at least 10-80% of the total amount sufficient to neutralize the hydrogen chloride generated during the reaction, the reaction is more stable and controllable, and contributes to an increase in the molecular weight of the polymer. Therefore, it is further preferred that the acid-binding agent is a mixture of an organic base and an inorganic base, and the amount of the organic base used is 10-80% of the total amount sufficient to neutralize the generated hydrogen chloride; and further preferably, the amount of the organic base used is 30-60% of the total amount sufficient to neutralize the generated hydrogen chloride.

Further preferably, the inorganic base in the acid-binding agent is an alkali metal and/or alkaline earth metal carbonate and/or bicarbonate, such as calcium carbonate, magnesium carbonate, potassium bicarbonate, lithium bicarbonate, or the like. The alkali metal chloride and/or alkaline earth metal chloride, such as lithium chloride, calcium chloride, or the like, generated during neutralization of hydrogen chloride by the alkali metal and/or alkali metal carbonate and/or bicarbonate, can further improve the solubility of the polymer in the solvent, and is beneficial to an increase in the molecular weight of the polymer. The carbon dioxide generated during the neutralization of hydrogen chloride can further participate in the reaction as a solvent.

Preferably, the method of the present invention comprises separately dissolving phenylenediamine and benzenedicarbonyl dichloride in a solvent to prepare a solution containing phenylenediamine and a solution containing benzenedicarbonyl dichloride.

Preferably, the acid-binding agent and the phenylenediamine are co-dissolved in a solvent to prepare a mixture liquid containing acid-binding agent-phenylenediamine-solvent. Further, the mixture liquid of acid-binding agent-phenylenediamine-solvent reacts with the solution containing benzenedicarbonyl dichloride.

Preferably, when a solvent is used to dissolve the phenylenediamine, the solvent is used in an amount 5-50 times the mass of the phenylenediamine; and when a solvent is used to dissolve the benzenedicarbonyl dichloride, the solvent is used in an amount 5-50 times the mass of the benzenedicarbonyl dichloride.

In the method described herein, after the reaction is completed, the liquid $CO_2$ or supercritical $CO_2$ fluid can be converted to a gaseous state by a change in temperature and/or pressure. The resultant $CO_2$ in a gaseous state can be subjected to further compression and condensation, and recovered for recycling.

In particular, the inventors have discovered that when liquid $CO_2$ or a supercritical $CO_2$ fluid, especially a supercritical $CO_2$ fluid in a high temperature and high pressure state, is used as a solvent, the transition to a gaseous state can be a process of gradual change by controlling the temperature and/or pressure, for example, gradually increasing the temperature, and gradually decreasing the pressure, or the like. Those skilled in the art can clearly understand the meaning of the gradual change of the state. A certain amount of heat can be provided to the reaction vessel, e.g., by means of jacket heating, heat preservation, or the like, or a regulating valve can be used, in order to prevent a rapid and sharp temperature drop, which can result in conversion of $CO_2$ to solid dry ice, thereby blocking the valve, pipeline, etc.

The supercritical $CO_2$ fluid as described herein refers to a state when the temperature and pressure of $CO_2$ are higher than its critical temperature and critical pressure.

The triple-point of $CO_2$ as described herein refers to a temperature and a pressure value at which three phases of $CO_2$ (i.e., gas phase, liquid phase, and solid phase) coexist.

The aramid as described herein is para-aramid or meta-aramid. Correspondingly, the polymerization method as described herein refers to a reaction of p-phenylenediamine with p-benzenedicarbonyl dichloride, or a reaction of m-phenylenediamine with m-benzenedicarbonyl dichloride.

Beneficial Effects of the Invention (1) The use of liquid carbon dioxide or supercritical carbon dioxide fluid as a solvent instead of a conventional solvent will not cause contamination of the product. The solvent is inexpensive, readily available and non-toxic. Separation of the product from the solvent can be achieved only by changing the temperature and/or pressure. The method is environmentally friendly, saves resources, has low cost, and is safe for production and suitable for industrial production.

(2) The polycondensate obtained in the present application has a controllable molecular weight, a good product quality, and an intrinsic viscosity ηinh of 8-9 dl/g. The yield in the aramid condensation stage can reach 98%, and the recovery rate of the aramid condensation solvent is higher than 90%.

EXAMPLES

In the following Examples, the intrinsic viscosity is measured on a polycondensate formulated at a concentration of 0.2 g/25 ml of $H_2SO_4$ in 98% sulfuric acid as a solvent, by an Ubbelohde viscometer at a temperature of 23° C., and the unit of the intrinsic viscosity ηinh is dl/g (deciliter/gram).

Example 1

To a pressure reactor equipped with a stirrer and connected to a dry nitrogen tube were added 4.80 g of p-phenylenediamine, and 9.33 g of the acid-binding agent triethylamine. The original gas was replaced with nitrogen, and liquid carbon dioxide was injected. The reactor was kept at a temperature of 25° C., and a pressure of no less than 7 MPa. Upon the substances in the pressure reactor were dissolved, a p-phenylenediamine-triethylamine-liquid carbon dioxide mixture liquid was prepared. To another pressure reactor equipped with a stirrer and connected to a dry nitrogen tube was added 9.02 g of p-benzenedicarbonyl dichloride. The original gas was replaced with nitrogen, and liquid carbon dioxide was injected. The reactor was kept at a temperature of 25° C., and a pressure of no less than 7 MPa. Upon the substance in the pressure reactor was dissolved, a solution of p-benzenedicarbonyl dichloride in liquid carbon dioxide was prepared. The solution of p-benzenedicarbonyl dichloride in liquid carbon dioxide was added to the p-phenylenediamine-triethylamine-liquid carbon dioxide mixture liquid while rapid stirring. The heat released from the reaction increased the temperature of the solution to exceed the critical temperature of carbon dioxide, and caused the pressure to exceed the critical pressure of carbon dioxide, resulting in a supercritical state of carbon dioxide, in which the solubility of an aramid polycondensate was increased. The stifling was continued until the reaction was completed. Water was added to the pressure reactor. The $CO_2$ gas was gradually discharged, and compressed and condensed again for recovery. After centrifugation, filtration, and removal of the residual acid-binding agent and other substances by washing, an aramid polycondensate was obtained upon drying.

The resultant dried aramid polycondensate was measured. The intrinsic viscosity ηinh of the polycondensate was 8.25 dl/g, the yield in the aramid condensation stage was 97%, and the recovery rate of $CO_2$ was higher than 90%.

Example 2

To a pressure reactor equipped with a stirrer and connected to a dry nitrogen tube were added 4.80 g of p-phenylenediamine, and 3.45 g of the acid-binding agent calcium hydroxide. The original gas was replaced with nitrogen, and liquid carbon dioxide was injected. The reactor was kept at a temperature of 15° C., and a pressure of no less than 6 MPa. Upon the substances in the pressure reactor were dissolved, a p-phenylenediamine-calcium hydroxide-liquid carbon dioxide mixture liquid was prepared. To another pressure reactor equipped with a stirrer and connected to a dry nitrogen tube was added 9.02 g of p-benzenedicarbonyl dichloride. The original gas was replaced with nitrogen, and liquid carbon dioxide was injected. The reactor was kept at a temperature of 15° C., and a pressure of no less than 6 MPa. Upon the substance in the pressure reactor was dissolved, a solution of p-benzenedicarbonyl dichloride in liquid carbon dioxide was prepared. The solution of p-benzenedicarbonyl dichloride in liquid carbon dioxide was added to the p-phenylenediamine-calcium hydroxide-liquid carbon dioxide mixture liquid while rapid stirring. The heat released from the reaction increased the temperature of the solution to exceed the critical temperature of carbon dioxide, and an increased pressure was applied simultaneously so that the pressure exceeded the critical pressure of carbon dioxide, resulting in a supercritical state of carbon dioxide, in which the solubility of an aramid polycondensate was increased. The stifling was continued until the reaction was completed. Water was added to the pressure reactor. The $CO_2$ gas was gradually discharged, and compressed and condensed again for recovery. After centrifugation, filtration, and removal of the residual acid-binding agent and other substances by washing, an aramid polycondensate was obtained upon drying.

The resultant dried aramid polycondensate was measured. The intrinsic viscosity ηinh of the polycondensate was 8.01 dl/g, the yield in the aramid condensation stage was 96.6%, and the recovery rate of $CO_2$ was higher than 90%.

Example 3

To a pressure reactor equipped with a stirrer and connected to a dry nitrogen tube were added 4.80 g of p-phenylenediamine, and 2.69 g of triethylamine and 2.36 g of calcium hydroxide as acid-binding agents. The original gas was replaced with nitrogen, and liquid carbon dioxide was injected. The reactor was kept at a temperature of 28° C., and a pressure of no less than 7 MPa. Upon the substances in the pressure reactor were dissolved, a p-phenylenediamine-triethylamine-calcium hydroxide-liquid carbon dioxide mixture liquid was prepared. To another pressure reactor equipped with a stirrer and connected to a dry nitrogen tube was added 9.02 g of p-benzenedicarbonyl dichloride. The original gas was replaced with nitrogen, and liquid carbon dioxide was injected. The reactor was kept at a temperature of 28° C., and a pressure of no less than 7 MPa. Upon the substance in the pressure reactor was dissolved, a solution of p-benzenedicarbonyl dichloride in liquid carbon dioxide was prepared. The solution of p-benzenedicarbonyl dichloride in liquid carbon dioxide was added to the p-phenylenediamine-triethylamine-calcium hydroxide-liquid carbon dioxide mixture liquid while rapid stirring. The heat released from the reaction increased the temperature of the solution to exceed the critical temperature of carbon dioxide, and caused the pressure to exceed the critical pressure of carbon dioxide, resulting in a supercritical state of carbon dioxide, in which the solubility of an aramid polycondensate was increased. The stirring was continued until the reaction was completed. Water was added to the pressure reactor. The $CO_2$ gas was gradually discharged, and compressed and condensed again for recovery. After centrifugation, filtration, and removal of the residual acid-binding agents and other substances by washing, an aramid polycondensate was obtained upon drying.

The resultant dried polymer was measured. The intrinsic viscosity ηinh of the polycondensate was 8.8 dl/g, the yield in the aramid condensation stage was 98%, and the recovery rate of $CO_2$ was higher than 90%.

Example 4

To a pressure reactor equipped with a stirrer and connected to a dry nitrogen tube were added 4.80 g of p-phenylenediamine, and 2.69 g of triethylamine and 2.36 g of calcium hydroxide as acid-binding agents. The original gas was replaced with nitrogen, and liquid carbon dioxide was injected. The reactor was kept at a temperature of −15° C., and a pressure of no less than 3 MPa. Upon the substances in the pressure reactor were dissolved, a p-phenylenediamine-triethylamine-calcium hydroxide-liquid carbon dioxide mixture liquid was prepared. To another pressure reactor equipped with a stirrer and connected to a dry nitrogen tube was added 9.02 g of p-benzenedicarbonyl dichloride. The original gas was replaced with nitrogen, and liquid carbon dioxide was injected. The reactor was kept at a temperature of −15° C., and a pressure of no less than 3 MPa. Upon the substance in the pressure reactor was dissolved, a solution of p-benzenedicarbonyl dichloride in liquid carbon dioxide was prepared. The solution of p-benzenedicarbonyl dichloride in liquid carbon dioxide was added to the p-phenylenediamine-triethylamine-calcium hydroxide-liquid carbon dioxide mixture liquid while rapid stirring. The carbon dioxide was maintained in a liquid state throughout the reaction. The stirring was continued until the reaction was completed. Water was added to the pressure reactor. The $CO_2$ gas was gradually discharged, and compressed and condensed again for recovery. After centrifugation, filtration, and removal of the residual acid-binding agents and other substances by washing, an aramid polycondensate was obtained upon drying.

The resultant dried polymer was measured. The intrinsic viscosity ηinh of the polycondensate was 8.4 dl/g, the yield in the aramid condensation stage was 97.3%, and the recovery rate of $CO_2$ was higher than 90%.

Example 5

To a pressure reactor equipped with a stirrer and connected to a dry nitrogen tube were added 4.80 g of m-phenylenediamine, and 4.49 g of triethylamine and 1.87 g of calcium hydroxide as acid-binding agents. The original gas was replaced with nitrogen, and liquid carbon dioxide was injected. The reactor was kept at a temperature of −25° C., and a pressure of no less than 2 MPa. Upon the substances in the pressure reactor were dissolved, an m-phenylenediamine-triethylamine-calcium hydroxide-liquid carbon dioxide mixture liquid was prepared. To another pressure reactor equipped with a stirrer and connected to a dry nitrogen tube was added 9.02 g of m-benzenedicarbonyl dichloride. The original gas was replaced with nitrogen, and liquid carbon dioxide was injected. The reactor was kept at a temperature of −25° C., and a pressure of no less than 2 MPa. Upon the substance in the pressure reactor was dissolved, a solution of m-benzenedicarbonyl dichloride in liquid carbon dioxide was prepared. The solution of m-benzenedicarbonyl dichloride in liquid carbon dioxide was added to the m-phenylenediamine-triethylamine-calcium hydroxide-liquid carbon dioxide mixture liquid while rapid stifling. The carbon dioxide was maintained in a liquid state throughout the reaction. The stirring was continued until the reaction was completed. Water was added to the pressure reactor. The $CO_2$ gas was gradually discharged, and compressed and condensed again for recovery. After centrifugation, filtration, and removal of the residual acid-binding agents and other substances by washing, an aramid polycondensate was obtained upon drying.

The resultant dried polymer was measured. The intrinsic viscosity ηinh of the polycondensate was 8.45 dl/g, the yield in the aramid condensation stage was 97.6%, and the recovery rate of $CO_2$ was higher than 90%.

Example 6

To a pressure reactor equipped with a stirrer and connected to a dry nitrogen tube were added 4.80 g of p-phenylenediamine, and 6.28 g of triethylamine and 1.73 g of calcium carbonate as acid-binding agents. The original gas was replaced with nitrogen, and liquid carbon dioxide was injected. The reactor was kept at a temperature of 5° C., and a pressure of no less than 4 MPa. Upon the substances in the pressure reactor were dissolved, a p-phenylenediamine-triethylamine-calcium carbonate-liquid carbon dioxide mixture liquid was prepared. To another pressure reactor equipped with a stirrer and connected to a dry nitrogen tube was added 9.02 g of p-benzenedicarbonyl dichloride. The original gas was replaced with nitrogen, and liquid carbon dioxide was injected. The reactor was kept at a temperature of 5° C., and a pressure of no less than 4 MPa. Upon the substance in the pressure reactor was dissolved, a solution of p-benzenedicarbonyl dichloride in liquid carbon dioxide was prepared. The solution of p-benzenedicarbonyl dichloride in liquid carbon dioxide was added to the p-phenylenediamine-triethylamine-calcium carbonate-liquid carbon dioxide mixture liquid while rapid stifling. The heat released from the reaction increased the temperature of the solution to exceed the critical temperature of carbon dioxide, and the pressure was simultaneously made to exceed the critical pressure of carbon dioxide, resulting in a supercritical state of carbon dioxide, in which the solubility of an aramid polycondensate was increased. The stirring was continued until the reaction was completed. Water was added to the pressure reactor. The $CO_2$ gas was gradually discharged, and compressed and condensed again for recovery. After centrifugation, filtration, and removal of the residual acid-binding agents and other substances by washing, an aramid polycondensate was obtained upon drying.

The resultant dried polymer was measured. The intrinsic viscosity ηinh of the polycondensate was 8.92 dl/g, the yield in the aramid condensation stage was 98%, and the recovery rate of $CO_2$ was higher than 90%.

Example 7

To a pressure reactor equipped with a stirrer and connected to a dry nitrogen tube were added 4.80 g of p-phenylenediamine, and 4.49 g of triethylamine and 1.54 g of calcium hydroxide as acid-binding agents. The original gas was replaced with nitrogen, and liquid carbon dioxide was injected. The reactor was kept at a temperature of −25° C., and a pressure of no less than 2 MPa. Upon the substances in the pressure reactor were dissolved, a p-phenylenediamine-triethylamine-calcium hydroxide-liquid carbon dioxide mixture liquid was prepared. To another pressure reactor equipped with a stirrer and connected to a dry nitrogen tube was added 9.02 g of p-benzenedicarbonyl dichloride. The original gas was replaced with nitrogen, and liquid carbon dioxide was injected. The reactor was kept at a temperature of −25° C., and a pressure of no less than 2 MPa. Upon the substance in the pressure reactor was dissolved, a solution of p-benzenedicarbonyl dichloride in liquid carbon dioxide was prepared. The solution of p-benzenedicarbonyl dichloride in liquid carbon dioxide was added to the p-phenylenediamine-triethylamine-calcium hydroxide-liquid carbon dioxide mixture liquid while rapid stirring. The carbon dioxide was maintained in a liquid state throughout the reaction. The stirring was continued until the reaction was completed. Water was added to the pressure reactor. The $CO_2$ gas was gradually discharged, and compressed and condensed again for recovery. After centrifugation, filtration, and removal of the residual acid-binding agents and other substances by washing, an aramid polycondensate was obtained upon drying.

The resultant dried polymer was measured. The intrinsic viscosity ηinh of the polycondensate was 8.39 dl/g, the yield in the aramid condensation stage was 97.3%, and the recovery rate of $CO_2$ was higher than 90%.

Example 8

To a pressure reactor equipped with a stirrer and connected to a dry nitrogen tube were added 4.80 g of p-phenylenediamine, and 2.61 g of triethylamine and 2.3 g of calcium hydroxide as acid-binding agents. The original gas was replaced with nitrogen, and liquid carbon dioxide was injected. The reactor was kept at a temperature of 25° C., and a pressure of no less than 7 MPa. Upon the substances in the pressure reactor were dissolved, a p-phenylenediamine-triethylamine-calcium hydroxide-liquid carbon dioxide mixture liquid was prepared. To another pressure reactor equipped with a stirrer and connected to a dry nitrogen tube was added 8.75 g of p-benzenedicarbonyl dichloride. The original gas was replaced with nitrogen, and liquid carbon dioxide was injected. The reactor was kept at a temperature of 25° C., and a pressure of no less than 7 MPa. Upon the substance in the pressure reactor was dissolved, a solution of p-benzenedicarbonyl dichloride in liquid carbon dioxide was prepared. The solution of p-benzenedicarbonyl dichloride in liquid carbon dioxide was added to the p-phenylenediamine-triethylamine-calcium hydroxide-liquid carbon dioxide mixture liquid while rapid stirring. The heat released from the reaction increased the temperature of the solution to exceed the critical temperature of carbon dioxide, and the pressure was simultaneously made to exceed the critical pressure of carbon dioxide, resulting in a supercritical state of carbon dioxide, in which the solubility of an aramid polycondensate was increased. The stirring was continued until the reaction was completed. Water was added to the pressure reactor. The $CO_2$ gas was gradually discharged, and compressed and condensed again for recovery. After centrifugation, filtration, and removal of the residual acid-binding agents and other substances by washing, an aramid polycondensate was obtained upon drying.

The resultant dried polymer was measured. The intrinsic viscosity ηinh of the polycondensate was 8.05 dl/g, the yield in the aramid condensation stage was 96%, and the recovery rate of $CO_2$ was higher than 90%.

Example 9

To a pressure reactor equipped with a stirrer and connected to a dry nitrogen tube were added 4.80 g of p-phenylenediamine, and 3.59 g of triethylamine and 2.07 g of calcium hydroxide as acid-binding agents. The original gas was replaced with nitrogen, and liquid carbon dioxide was injected. The reactor was kept at a temperature of 25° C., and a pressure of no less than 7 MPa. Upon the substances in the pressure reactor were dissolved, a p-phenylenediamine-triethylamine-calcium hydroxide-liquid carbon dioxide mixture liquid was prepared. To another pressure reactor equipped with a stirrer and connected to a dry nitrogen tube was added 9.2 g of p-benzenedicarbonyl dichloride. The original gas was replaced with nitrogen, and liquid carbon dioxide was injected. The reactor was kept at a temperature of 25° C., and a pressure of no less than 7 MPa. Upon the substance in the pressure reactor was dissolved, a solution of p-benzenedicarbonyl dichloride in liquid carbon dioxide was prepared. The solution of p-benzenedicarbonyl dichloride in liquid carbon dioxide was added to the p-phenylenediamine-triethylamine-calcium hydroxide-liquid carbon dioxide mixture liquid while rapid stirring. The heat released from the reaction increased the temperature of the solution to exceed the critical temperature of carbon dioxide, and the pressure was simultaneously made to exceed the critical pressure of carbon dioxide, resulting in a supercritical state of carbon dioxide, in which the solubility of an aramid polycondensate was increased. The stirring was continued until the reaction was completed. Water was added to the pressure reactor. The $CO_2$ gas was gradually discharged, and compressed and condensed again for recovery. After centrifugation, filtration, and removal of the residual acid-binding agents and other substances by washing, an aramid polycondensate was obtained upon drying.

The resultant dried polymer was measured. The intrinsic viscosity ηinh of the polycondensate was 8.07 dl/g, the yield in the aramid condensation stage was 96.2%, and the recovery rate of $CO_2$ was higher than 90%.

Example 10

To a pressure reactor equipped with a stirrer and connected to a dry nitrogen tube were added 4.80 g of p-phenylenediamine, and 9.34 g of the acid-binding agent triethylamine. The original gas was replaced with nitrogen, and liquid carbon dioxide was added. The reactor was kept at a temperature of 35° C., and a pressure of 8 MPa. Upon the substances in the pressure reactor were dissolved, a p-phenylenediamine-triethylamine-supercritical carbon dioxide mixture liquid was prepared. To another pressure reactor equipped with a stirrer and connected to a dry nitrogen tube was added 9.02 g of p-benzenedicarbonyl dichloride. The original gas was replaced with nitrogen, and liquid carbon dioxide was added. The reactor was kept at a temperature of 35° C., and a pressure of 8 MPa. Upon the substance in the pressure reactor was dissolved, a solution of p-benzenedicarbonyl dichloride in supercritical carbon dioxide was prepared. The solution of p-benzenedicarbonyl dichloride in supercritical carbon dioxide was added to the p-phenylenediamine-triethylamine-supercritical carbon dioxide mixture liquid while rapid stirring. The carbon dioxide was maintained in a supercritical state throughout the reaction. The stirring was continued until the reaction was completed. Water was added to the pressure reactor. The $CO_2$ gas was gradually discharged, and compressed and condensed again for recovery. After centrifugation, filtration, and removal of the residual acid-binding agent and other substances by washing, an aramid polycondensate was obtained upon drying.

The resultant dried polymer was measured. The intrinsic viscosity ηinh of the polycondensate was 8.3 dl/g, the yield in the aramid condensation stage was 97.4%, and the recovery rate of $CO_2$ was higher than 90%.

Example 11

To a pressure reactor equipped with a stirrer and connected to a dry nitrogen tube were added 4.80 g of p-phenylenediamine, and 3.45 g of the acid-binding agent calcium hydroxide. The original gas was replaced with nitrogen, and liquid carbon dioxide was added. The reactor was kept at a temperature of 60° C., and a pressure of 20 MPa. Upon the substances in the pressure reactor were dissolved, a p-phenylenediamine-calcium hydroxide-supercritical carbon dioxide mixture liquid was prepared. To another pressure reactor equipped with a stirrer and connected to a dry nitrogen tube was added 9.02 g of p-benzenedicarbonyl dichloride. The original gas was replaced with nitrogen, and liquid carbon dioxide was added. The reactor was kept at a temperature of 60° C., and a pressure of 20 MPa. Upon the substance in the pressure reactor was dissolved, a solution of p-benzenedicarbonyl dichloride in supercritical carbon dioxide was prepared. The solution of p-benzenedicarbonyl dichloride in supercritical carbon dioxide was added to the p-phenylenediamine-calcium hydroxide-supercritical carbon dioxide mixture liquid while rapid stirring. The carbon dioxide was maintained in a supercritical state throughout the reaction. The stirring was continued until the reaction was completed. Water was added to the pressure reactor. The $CO_2$ gas was gradually discharged, and compressed and condensed again for recovery. After centrifugation, filtration, and removal of the residual acid-binding agent and other substances by washing, an aramid polycondensate was obtained upon drying.

The resultant dried polymer was measured. The intrinsic viscosity ηinh of the polycondensate was 8.1 dl/g, the yield in the aramid condensation stage was 96.7%, and the recovery rate of $CO_2$ was higher than 90%.

Example 12

To a pressure reactor equipped with a stirrer and connected to a dry nitrogen tube were added 4.80 g of p-phenylenediamine, and 2.69 g of triethylamine and 2.37 g of calcium hydroxide as acid-binding agents. The original gas was replaced with nitrogen, and liquid carbon dioxide was added. The reactor was kept at a temperature of 35° C., and a pressure of 8 MPa. Upon the substances in the pressure reactor were dissolved, a p-phenylenediamine-triethylamine-calcium hydroxide-supercritical carbon dioxide mixture liquid was prepared. To another pressure reactor equipped with a stirrer and connected to a dry nitrogen tube was added 9.02 g of p-benzenedicarbonyl dichloride. The original gas was replaced with nitrogen, and liquid carbon dioxide was added. The reactor was kept at a temperature of 35° C., and a pressure of 8 MPa. Upon the substance in the pressure reactor was dissolved, a solution of p-benzenedicarbonyl dichloride in supercritical carbon dioxide was prepared. The solution of p-benzenedicarbonyl dichloride in supercritical carbon dioxide was added to the p-phenylenediamine-triethylamine-calcium hydroxide-supercritical carbon dioxide mixture liquid while rapid stifling. The carbon dioxide was maintained in a supercritical state throughout the reaction. The stirring was continued until the reaction was completed. Water was added to the pressure reactor. The $CO_2$ gas was gradually discharged, and compressed and condensed again for recovery. After centrifugation, filtration, and removal of the residual acid-binding agents and other substances by washing, an aramid polycondensate was obtained upon drying.

The resultant dried polymer was measured. The intrinsic viscosity ηinh of the polycondensate was 8.9 dl/g, the yield in the aramid condensation stage was 98.4%, and the recovery rate of $CO_2$ was higher than 90%.

Example 13

To a pressure reactor equipped with a stirrer and connected to a dry nitrogen tube were added 4.80 g of m-phenylenediamine, and 3.15 g of trimethylamine and 1.57 g of lithium carbonate as acid-binding agents. The original gas was replaced with nitrogen, and liquid carbon dioxide was added. The reactor was kept at a temperature of 60° C., and a pressure of 20 MPa. Upon the substances in the pressure reactor were dissolved, a p-phenylenediamine-trimethylamine-lithium carbonate-supercritical carbon dioxide mixture liquid was prepared. To another pressure reactor equipped with a stirrer and connected to a dry nitrogen tube was added 9.02 g of m-benzenedicarbonyl dichloride. The original gas was replaced with nitrogen, and liquid carbon dioxide was added. The reactor was kept at a temperature of 60° C., and a pressure of 20 MPa. Upon the substance in the pressure reactor was dissolved, a solution of m-benzenedicarbonyl dichloride in supercritical carbon dioxide was prepared. The solution of m-benzenedicarbonyl dichloride in supercritical carbon dioxide was added to the m-phenylenediamine-trimethylamine-lithium carbonate-supercritical carbon dioxide mixture liquid while rapid stirring. The carbon dioxide was maintained in a supercritical state throughout the reaction. The stirring was continued until the reaction was completed. Water was added to the pressure reactor. The $CO_2$ gas was gradually discharged, and compressed and condensed again for recovery. After centrifugation, filtration, and removal of the residual acid-binding agents and other substances by washing, an aramid polycondensate was obtained upon drying.

The resultant dried polymer was measured. The intrinsic viscosity ηinh of the polycondensate was 8.86 dl/g, the yield in the aramid condensation stage was 98.2%, and the recovery rate of $CO_2$ was higher than 90%.

Example 14

To a pressure reactor equipped with a stirrer and connected to a dry nitrogen tube were added 4.80 g of p-phenylenediamine, and 3.5 g of pyridine and 2.4 g of calcium carbonate as acid-binding agents. The original gas was replaced with nitrogen, and liquid carbon dioxide was added. The reactor was kept at a temperature of 100° C., and a pressure of 10 MPa. Upon the substances in the pressure reactor were dissolved, a p-phenylenediamine-pyridine-calcium carbonate-supercritical carbon dioxide mixture liquid was prepared. To another pressure reactor equipped with a stirrer and connected to a dry nitrogen tube was added 9.02 g of p-benzenedicarbonyl dichloride. The original gas was replaced with nitrogen, and liquid carbon dioxide was added. The reactor was kept at a temperature of 100° C., and a pressure of 10 MPa. Upon the substance in the pressure reactor was dissolved, a solution of p-benzenedicarbonyl dichloride in supercritical carbon dioxide was prepared. The solution of p-benzenedicarbonyl dichloride in supercritical carbon dioxide was added to the p-phenylenediamine-pyridine-calcium carbonate-supercritical carbon dioxide mixture liquid while rapid stirring. The carbon dioxide was maintained in a supercritical state throughout the reaction. The stirring was continued until the reaction was completed. Water was added to the pressure reactor. The $CO_2$ gas was gradually discharged, and compressed and condensed again for recovery. After centrifugation, filtration, and removal of the residual acid-binding agents and other substances by washing, an aramid polycondensate was obtained upon drying.

The resultant dried polymer was measured. The intrinsic viscosity ηinh of the polycondensate was 9 dl/g, the yield in the aramid condensation stage was 98.7%, and the recovery rate of $CO_2$ was higher than 90%.

Example 15

To a pressure reactor equipped with a stirrer and connected to a dry nitrogen tube were added 4.80 g of p-phenylenediamine, and 2.69 g of triethylamine and 5.08 g of sodium bicarbonate as acid-binding agents. The original gas was replaced with nitrogen, and liquid carbon dioxide was added. The reactor was kept at a temperature of 50° C., and a pressure of 8 MPa. Upon the substances in the pressure reactor were dissolved, a p-phenylenediamine-triethylamine-sodium bicarbonate-supercritical carbon dioxide mixture liquid was prepared. To another pressure reactor equipped with a stirrer and connected to a dry nitrogen tube was added 9.02 g of p-benzenedicarbonyl dichloride. The original gas was replaced with nitrogen, and liquid carbon dioxide was added. The reactor was kept at a temperature of 50° C., and a pressure of 8 MPa. Upon the substance in the pressure reactor was dissolved, a solution of p-benzenedicarbonyl dichloride in supercritical carbon dioxide was prepared. The solution of p-benzenedicarbonyl dichloride in supercritical carbon dioxide was added to the p-phenylenediamine-triethylamine-sodium bicarbonate-supercritical carbon dioxide mixture solution while rapid stirring. The carbon dioxide was maintained in a supercritical state throughout the reaction. The stirring was continued until the reaction was completed. Water was added to the pressure reactor. The $CO_2$ gas was gradually discharged, and compressed and condensed again for recovery. After centrifugation, filtration, and removal of the residual acid-binding agents and other substances by washing, an aramid polycondensate was obtained upon drying.

The resultant dried polymer was measured. The intrinsic viscosity ηinh of the polycondensate was 8.58 dl/g, the yield in the aramid condensation stage was 97.4%, and the recovery rate of $CO_2$ was higher than 90%.

Example 16

To a pressure reactor equipped with a stirrer and connected to a dry nitrogen tube were added 4.80 g of p-phenylenediamine, and 2.64 g of triethylamine and 2.32 g of calcium hydroxide as acid-binding agents. The original gas was replaced with nitrogen, and liquid carbon dioxide was added. The reactor was kept at a temperature of 35° C., and a pressure of 8 MPa. Upon the substances in the pressure reactor were dissolved, a p-phenylenediamine-triethylamine-calcium hydroxide-supercritical carbon dioxide mixture liquid was prepared. To another pressure reactor equipped with a stirrer and connected to a dry nitrogen tube was added 8.84 g of p-benzenedicarbonyl dichloride. The original gas was replaced with nitrogen, and liquid carbon dioxide was added. The reactor was kept at a temperature of 35° C., and a pressure of 8 MPa. Upon the substance in the pressure reactor was dissolved, a solution of p-benzenedicarbonyl dichloride in supercritical carbon dioxide was prepared. The solution of p-benzenedicarbonyl dichloride in supercritical carbon dioxide was added to the p-phenylenediamine-triethylamine-calcium hydroxide-supercritical carbon dioxide mixture liquid while rapid stifling. The carbon dioxide was maintained in a supercritical state throughout the reaction. The stirring was continued until the reaction was completed. Water was added to the pressure reactor. The $CO_2$ gas was gradually discharged, and compressed and condensed again for recovery. After centrifugation, filtration, and removal of the residual acid-binding agents and other substances by washing, an aramid polycondensate was obtained upon drying.

The resultant dried polymer was measured. The intrinsic viscosity ηinh of the polycondensate was 8.08 dl/g, the yield in the aramid condensation stage was 96.4%, and the recovery rate of $CO_2$ was higher than 90%.

Example 17

To a pressure reactor equipped with a stirrer and connected to a dry nitrogen tube were added 4.80 g of p-phenylenediamine, and 3.15 g of trimethylamine and 1.58 g of lithium carbonate as acid-binding agents. The original gas was replaced with nitrogen, and liquid carbon dioxide was added. The reactor was kept at a temperature of 60° C., and a pressure of 20 MPa. Upon the substances in the pressure reactor were dissolved, a p-phenylenediamine-trimethylamine-lithium carbonate-supercritical carbon dioxide mixture liquid was prepared. To another pressure reactor equipped with a stirrer and connected to a dry nitrogen tube was added 9.29 g of p-benzenedicarbonyl dichloride. The original gas was replaced with nitrogen, and liquid carbon dioxide was added. The reactor was kept at a temperature of 60° C., and a pressure of 20 MPa. Upon the substance in the pressure reactor was dissolved, a solution of p-benzenedicarbonyl dichloride in supercritical carbon dioxide was prepared. The solution of p-benzenedicarbonyl dichloride in supercritical carbon dioxide was added to the p-phenylenediamine-trimethylamine-lithium carbonate-supercritical carbon dioxide mixture liquid while rapid stirring. The carbon dioxide was maintained in a supercritical state throughout the reaction. The stirring was continued until the reaction was completed. Water was added to the pressure reactor. The $CO_2$ gas was gradually discharged, and compressed and condensed again for recovery. After centrifugation, filtration, and removal of the residual acid-binding agents and other substances by washing, an aramid polycondensate was obtained upon drying.

The resultant dried polymer was measured. The intrinsic viscosity ηinh of the polycondensate was 8.1 dl/g, the yield in the aramid condensation stage was 96%, and the recovery rate of $CO_2$ was higher than 90%.

The method for aramid polymerization using carbon dioxide as a solvent according to the present invention has been described with reference to the preferred embodiments. It is obvious to those skilled in the art that the method described herein can be appropriately modified, changed, or combined to implement the techniques of the present invention without departing from the content, spirit, and scope of the present invention. It should be noted that all such substitutions and modifications are apparent to those skilled in the art and are considered to be included in the spirit, scope and content of the present invention.

We claim:

1. A method for aramid polymerization using carbon dioxide as a solvent, comprising
    mixing phenylenediamine and an acid-binding agent in liquid carbon dioxide in a first pressure reactor to form a mixture and converting the mixture in the first pressure reactor to a condition above the critical temperature and critical pressure of carbon dioxide to obtain a phenylenediamine-acid-binding agent-supercritical carbon dioxide mixture liquid,
    mixing benzenedicarbonyl dichloride in liquid carbon dioxide in a second pressure reactor to form a mixture and converting the mixture in the second pressure reactor to a condition above the critical temperature and the critical pressure of carbon dioxide to obtain a benzenedicarbonyl dichloride-supercritical carbon dioxide mixture liquid,
    combining and reacting the phenylenediamine-acid-binding agent-supercritical carbon dioxide mixture liquid and the benzenedicarbonyl dichloride-supercritical carbon dioxide mixture liquid in a polymerization pressure reactor, and maintaining the carbon dioxide in the polymerization pressure reactor at supercritical conditions throughout the reaction,
    after the reaction is complete, adding water to the polymerization pressure reactor and gradually changing temperature, pressure, or both, to convert supercritical carbon dioxide to gaseous carbon dioxide and to prevent formation of solid dry ice, discharging, condensing, and recovering the gaseous carbon dioxide, and obtaining aramid polymerization reaction product,
    wherein the acid-binding agent is a mixture of an organic base and an inorganic base, and the amount of the organic base in the acid-binding agent is 10 to 80% of a total amount of the acid-binding agent, and the total amount of the acid-binding agent is sufficient to neutralize hydrogen chloride generated in the reaction.

2. The method according to claim 1, wherein the reaction temperature is between 31.1 and 120° C., and the reaction pressure is between 7.29 and 50 MPa.

3. The method according to claim 1, wherein a molar ratio of the phenylenediamine to the benzenedicarbonyl dichloride combined in the polymerization pressure reactor is (0.95-1.0): (0.95-1.0).

4. The method according to claim 1, wherein the total amount of the acid-binding agent used in the reaction system is 0.95 to 1.2 times of a theoretical stoichiometric amount of the acid-binding agent required to neutralize the hydrogen chloride generated in the reaction.

5. The method according to claim 1, wherein the inorganic base in the acid-binding agent is an alkali metal carbonate, an alkaline earth metal carbonate, an alkali metal bicarbonate, an alkali earth metal bicarbonate, or a combination thereof.

6. The method according to claim 1, wherein an amount of the liquid carbon dioxide used for preparing the mixture comprising the phenylenediamine is 5 to 50 times of the mass of the phenylenediamine in the mixture.

7. The method according to claim 1, wherein a molar ratio of the phenylenediamine to the benzenedicarbonyl dichloride combined in the polymerization pressure reactor is 1:1.

8. The method according to claim 1, wherein an amount of the acid-binding agent is 1.01 to 1.1 times of a theoretical stoichiometric amount of the acid-binding agent required to neutralize the hydrogen chloride generated in the reaction.

9. The method according to claim 1, wherein an amount of the organic base is 30 to 60% of the total amount of the acid-binding agent.

10. The method according to claim 1, wherein an amount of the liquid carbon dioxide used for preparing the mixture comprising the benzenedicarbonyl dichloride is 5 to 50 times of the mass of the benzenedicarbonyl dichloride in the mixture.

* * * * *